May 29, 1962     H. SCHIER     3,036,491
OPTICAL ARRANGEMENT FOR INSPECTING BODIES OF REVOLUTION
Filed Aug. 20, 1958
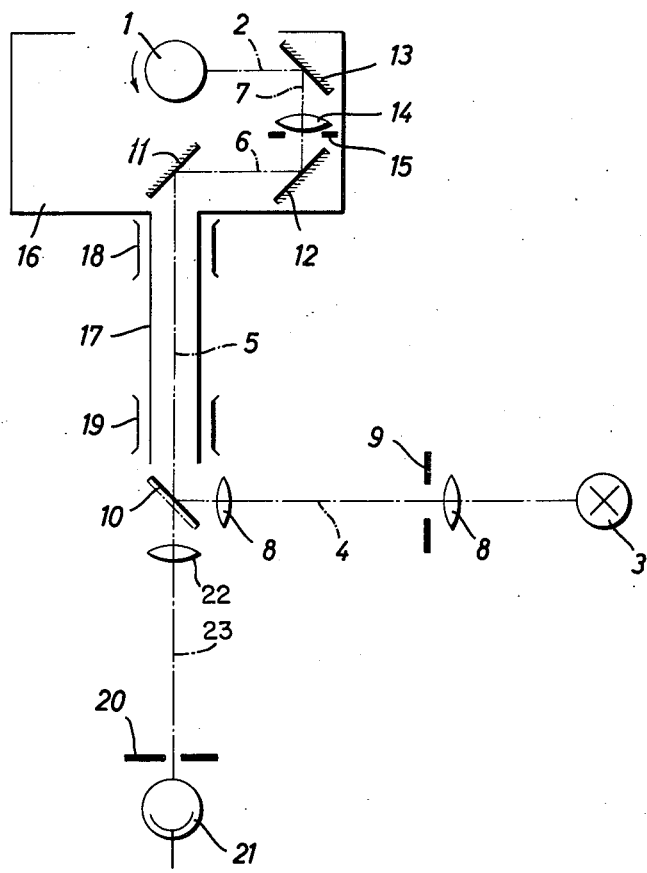
Inventor
Hans Schier

United States Patent Office

3,036,491
Patented May 29, 1962

3,036,491
OPTICAL ARRANGEMENT FOR INSPECTING
BODIES OF REVOLUTION
Hans Schier, Schweinfurt, Germany
(Box 278, Williamstown 1, Mass.)
Filed Aug. 20, 1958, Ser. No. 756,159
3 Claims. (Cl. 88—14)

Where bodies of revolution, especially such bodies of revolution as are used as the rolling elements of anti-friction bearings, i.e. ball and roller bearings, are manufactured on a mass-production basis, it has been customary to subject such bodies of revolution to a visual inspection process; however, the heretofore known methods of visually inspecting bodies of revolution do not make it possible with complete certainty to inspect the entire surface of a body under test and to detect all surface imperfections.

This drawback is eliminated by the present invention which provides an apparatus for inspecting bodies of revolution, particularly the rolling elements of antifriction bearings, and of detecting any surface imperfections that may be present in such elements, the apparatus of the invention permitting the surface of a body under test to be traced or scanned by means of a pencil of light which, with the aid of a microscope of the top-illumination type, is directed in such a manner that it strikes the surface of the body under test in a substantially perpendicular direction, the apparatus of the invention further providing for a relative movement to be imparted to both the body under test and an array of mirrors surrounding the said body. In a specific embodiment of the invention, an additional advantage may be attained by imparting a relatively slow movement to the body of revolution under test, whilst a relatively fast movement is imparted to the said array of mirrors.

Other and further objects, features and advantages of the present invention will become apparent to those skilled in the art from the following detailed disclosure thereof and the drawing attached hereto and made a part hereof.

On the drawing:

The only drawing attached hereto is a diagrammatic representation of one embodiment of the present invention.

The body of revolution 1 which is to be inspected for the presence of surface imperfections is supported by suitable means (not shown) including magnetically or pneumatically acting guide means permitting the said body to be rotated and, if desired, to be moved in an axial direction. Particularly in the case of non-spherical bodies of revolution, provision will be made for the body under test to be moved in an axial direction. For the sake of simplicity, the drawing shows a spherical body of revolution.

The body under test 1 is illuminated by means of a scanning beam of light 2 which is produced by the source of light 3 and which is directed onto the body 1 along the paths 4, 5, 6 and 7 by means of the condenser lens arrangement 8, 8, the semi-transparent mirror 10, the deflecting mirrors 11, 12, 13 and the object glass 14 cooperating with a diaphragm 15. The mirrors 11, 12, 13, the object glass 14 and the diaphragm 15 are supported by a holder 16. Arranged within the holder 16, at the center of the bottom portion of the holder remote from the source of light 3, is the body of revolution 1 to be inspected. Between the mirror holder 16 and the light source 3 there extends a tube 17 which, in the case of the one embodiment mentioned earlier, is carried for rotation in two bearings 18 and 19 so that it is possible, according to the required testing conditions, to impart a rotary motion to the mirror holder 16 and its associated tube 17, it being possible, where necessary, to impart a high rotary velocity to the said parts.

The semi-transparent mirror 10 permits the reflected beam 23 to pass through in a straight direction, and the lens system 22 focuses the beam 23 on the adjustable diaphragm 20 where an image of the illuminated surface element of the body 1 is formed. Behind the diaphragm 20 that portion of the reflected beam which passes the diaphragm is allowed to strike the photo-electric cell 21. This photo-electric cell is conveniently embodied in a secondary-electron multiplier which may be connected to per se known electronic means permitting the entire inspection procedure to be performed automatically and to be followed by a step during which the bodies under test are classified.

It has already been mentioned that during the inspection of the body under test both the said body and the mirror holder 16 either together or without the elongated tube 17 are moved in relation to one another. The velocity of the relative motion between the body of revolution on the one hand and the mirror holder on the other may be selected at will so as to meet the specifications to which the inspection has to be carried out. To increase the capacity of the arrangement it is convenient to provide for a very high velocity of the said relative movement, this not being done by imparting a fast motion to the ball under test and a slow rotation to the mirror holder but rather by imparting a relatively slow motion to the ball under test in the direction of the arrow and a fast motion to the mirror holder.

The sensitivity of the arrangement may be varied by providing adjustable diaphragms 9, 15 and 20. This makes it possible to compensate for differences in the mechanical condition of the surfaces of the bodies to be inspected.

I claim:

1. Apparatus for inspecting balls for surface imperfections comprising a top illumination microscope having a stationary condenser arrangement with a light source and a stationary detector arrangement including a projective lens, a diaphragm and a light sensitive element, a rotatable mirror holder, a system of mirrors and an objective lens mounted in the holder within which a rotating ball is adapted to be disposed with the holder rotating about the ball and the mirror system being disposed to direct a pencil beam of light from the condenser arrangement substantially perpendicularly onto the ball and perpendicular to the axis of rotation of the mirror holder with the reflected beam following the same path in the opposite direction as the beam of light to the detector arrangement.

2. Apparatus as claimed in claim 1, wherein said holder has an opening for the beam of light, a tube communicating with the opening and extending outwardly from the holder along the axis of rotation of the holder and through which centrally passes the beam of light and the reflected beam both following the same path, and bearings supporting the tube for rotation.

3. Apparatus for inspecting balls for surface imperfections comprising a top illumination microscope having a stationary condenser arrangement with a light source and a stationary detector arrangement including a projective lens, a diaphragm and a light sensitive element, a rotatable mirror holder, a system of mirrors and an objective lens mounted in the holder within which a rotating ball is adapted to be disposed, means imparting a relatively slow rotary movement to the ball with the holder rotating about the ball in a relatively fast motion, and the mirror system being disposed to direct a pencil beam of light from the condenser arrangement substantially perpendicularly onto the ball and perpendicular to the axis of rotation of the mirror holder with the reflected beam following the same path in the opposite direction as the beam of light to the detector arrangement.

References Cited in the file of this patent

UNITED STATES PATENTS

| | | |
|---|---|---|
| 2,691,306 | Beams et al. | Oct. 12, 1954 |
| 2,823,301 | Stevens | Feb. 11, 1958 |
| 2,857,800 | Stevens | Oct. 28, 1958 |
| 2,895,373 | Eyraud | July 21, 1959 |

FOREIGN PATENTS

| | | |
|---|---|---|
| 642,456 | Great Britain | Sept. 6, 1950 |
| 692,916 | France | Aug. 11, 1930 |
| 1,021,173 | Germany | Dec. 19, 1957 |

OTHER REFERENCES

"A Microdensitometer for Reflecting Samples," Altman et al., Photographic Science and Technique (PSA Technical Quarterly), Series 2, vol. 4, Feb. 1957, pages 10–12.